United States Patent [19]

Lazzari

[11] 4,321,606
[45] Mar. 23, 1982

[54] MAGNETIC TYPE PRINTING PROCESS AND MULTICOPY MAGNETIC PRINTING MACHINE

[75] Inventor: Jean-Pierre Lazzari, Montfort l'Amaury, France

[73] Assignee: Compagnie Internationale pour l'Informatique Cii Honeywell Bull (Societe Anonyme), Paris, France

[21] Appl. No.: 89,040

[22] Filed: Oct. 29, 1979

[30] Foreign Application Priority Data

Feb. 23, 1979 [FR] France ................................ 79 04616

[51] Int. Cl.³ .............................................. G11B 11/00
[52] U.S. Cl. ...................................... 346/74.1; 101/113
[58] Field of Search ............... 396/74.1; 101/113, 426, 101/17

[56] References Cited

U.S. PATENT DOCUMENTS 3,530,794  9/1970  Ritzerfeld .......................... 101/426
3,987,728  10/1976  Miller et al. ...................... 101/426

FOREIGN PATENT DOCUMENTS 2319148  2/1977  France .
2343273  9/1977  France .
473410  7/1969  Switzerland .

Primary Examiner—Glen R. Swann, III
Attorney, Agent, or Firm—Kerkam, Stowell, Kondracki & Clarke

[57] ABSTRACT

A magnetic printing process and multicopy magnetic printing machine employing this process is disclosed. The machine comprises a magnetizable carrier 2, magnetic recording transducers 8, an applicator 10 for coating a developer product onto the carrier, a device for application of the carrier coated with the said developer product onto a document 12 which is to be printed and finally a device 16 for erasing the magnetized areas. In accordance with the invention, the developer product utilized contains magnetic particles which are formed by grains whose dimensions are of the order of those of the elementary magnetized areas. The imprint on the document is then produced by pressing.

13 Claims, 3 Drawing Figures

MAGNETIC TYPE PRINTING PROCESS AND MULTICOPY MAGNETIC PRINTING MACHINE

BACKGROUND OF THE INVENTION

1. Field of the Invention

The present invention relates to a magnetic type printing process and to a printing machine employing this process. It finds application in data processing, telecommunications, telecopying, etc. . . .

2. Description of the Prior Art

The principle of magnetic printing machines is known. Magnetized areas of very small size (which will hereinafter be referred to as "elementary" areas) may be recorded on a magnetized support or carrier. These areas are commonly grouped in matrix form, in blocks of 5×7 or 7×9 elements, for example. They render it possible to outline latent magnetic characters having the form of printing characters. A pulverulent product containing ferromagnetic particles is deposited on this carrier and the particles are attracted by and affixed on the magnetized areas to thus display the characters recorded. The carrier coated with the developer product may then be applied onto the document to be printed in order to transfer the recorded characters onto this document. An erasing device erases the characters recorded which renders the carrier again available for receiving fresh symbols.

The method of recording magnetized areas on a magnetic carrier is well known. In order to magnetize a material, the material is first exposed to a magnetic field whose intensity is sufficient for the material to be saturated, that is, for the magnetic induction to have a limiting value. The magnetic field is then cancelled. A magnetic induction differing from a nil value, which is referred to as remanent induction, the remains within the material.

Magnetic carriers are commonly of two kinds:

1. longitudinal magnetization carriers, wherein the direction of magnetic induction is parallel to the carrier surface; and 2. perpendicular magnetization carriers, wherein the direction of magnetic induction is perpendicular to the surface of the carrier.

A device for recording characters is thus formed by coordinating a magnetic carrier of the longitudinally or perpendicular magnetization type with a plurality of recording transducers. Each transducer commonly consists of an electromagnet whose air gap is a very narrow slot not exceeding a few microns, so that the lines of magnetic induction in air are concentrated. The carrier utilized for magnetic printers may take a variety of forms, such as, for example, drum, tape, etc. . . .

Means of this type can for instance comprise a carrier produced from a material of high magnetic permeability, such as iron or mild steel. The carrier is coated with a layer of magnetic material. The perpendicular magnetization of this carrier is produced by means of a recording transducer comprising a magnetic core on which a coil is wound. This device is formed in such manner as to have a recording pole and a flux closure pole whose cross-section is greater than that of the recording pole.

In respect of the means for depositing a developer product on a magnetic carrier, this may take many forms such as, for example, an air jet device, a magnetic conveyor or a vibrating plate.

In the printing machines of this kind, the developer product employed consists of a pulverulent ferromagnetic pigment of very small grain size, mixed with a coating product. The magnetic grains of the developer product have much smaller dimensions that the dimensions of each elementary magnetized area (for example, a few microns as opposed to some hundred microns). This product must fulfill very stringent conditions. It must not only adhere to the magnetized areas of the recording element, but must equally be transferable on to the receiving paper sheet with which it is placed in contact. It must be able to meet freely at a relatively low temperature, to avoid the risks of burning or carbonizing the paper, but its melting point must not be too low, so as to avoid the appearance of a softening action which would inhibit the transfer on to the paper. Moreover, if appropriate, this product must accept a coloring agent intended to increase the contrast between the paper background and the printed symbols. Finally, it is essential that the pulverulent product should be formed by relatively fine solid particles so that it produces images of satisfactory quality on the paper. However, when they are melted, these particles must neither spread over the paper, nor diffuse within the same to avoid images which would appear blurred.

It should be appreciated that the production of an appropriate developer product is both an essential matter and a problem difficult to resolve, and it should certainly be appreciated that none of the products now utilized give complete satisfaction.

SUMMARY OF THE INVENTION

A specific object of the invention is to provide a printing process and a printing machine employing this process, which resolve this difficulty. In effect, the invention proposes to employ as a developer product, a ferromagnetic powder of sufficiently large grain size for each grain to cover an elementary area, the characters developed by this powder thus appearing raised on the magnetizable carrier. The developer product consequently no longer contains any coating product. Characters of this kind lend themselves to a pressing operation on the document which is to be printed, which may then be formed by a sheaf of several sheets provided with interleaved sheets of carbon paper type.

The advantages gained by the invention are of dual nature. Firstly, in respect of the developer product applied, in the case of the invention, the absence of the coating product around the magnetic grains considerably increases the apparent magnetization of these grains. In practice, use was made in the prior art of, for example, grains of a size of a few microns, embedded in a resin matrix of a size of approximately 20 microns, so that the mean density of the magnetized particles was very low. For magnetized particles having an inherent magnetization of 500 G, with a density of 1/10th by volume, a mean magnetization of 50 G, which is very low, was obtained.

By contrast, in the present invention, the absence of the coating product and the application of magnetic materials such as iron, cobalt, nickel, resulted in much higher degrees of ingerent magnetization (20,000 G, 18,000 G and 4,000 G, respectively).

The second advantage gained by the invention is related to the possiblity of producing several copies at the same time, since the developed character transfer operation is performed by pressing onto the document which is to be printed. Furthermore, it is certainly preferable from the point of view of print quality, to obtain simultaneous copies rather than consecutive copies. At all events, it is still possible within the scope of the invention to make several consecutive impressions on several sheaves.

Accordingly, another specific object of the present invention is to provide a printing process wherein elementary magnetized areas forming printing characters are recorded on a magnetizable carrier, a developer product containing magnetic particles which are attracted by and fixed on the magnetized areas and thus develop the characters recorded is deposited on this carrier, is the developer product containing magnetic particles formed by grains of which the dimensions are of the order of those of the elementary magnetized areas, a grain being able to cover a large proportion of an elementary magnetized area, such that the symbols developed on the carrier by means of such grains appear raised on the carrier; and the raised symbols are pressed against the document which is to be printed.

The invention equally relates to a printing machine employing ths process. This machine comprises a magnetizable carrier, magnetic transducers for recording elementary magnetized areas to form print characters on the carrier, a device for applying a developer product onto the carrier, the developer product containing magnetic particles which are attracted by and fixed on the magnetized areas and thus develop the characters recorded, a device for applying the carrier coated with the said developer product onto a document which is to be printed, this machine being characterized in that the developer product applied contains magnetic particles which are formed by grains whose dimensions are of the order of those of the elementary magnetized areas, a grain being able to cover a large proportion of a magnetized area, the characters developed by such grains thus appearing in raised form, and the device for applying the carrier against the document which is to be printed comprises means such that the raised characters exert a pressure on the document which is to be printed.

The dimensions of the grain, in other words the granulometry of the powder, depends on the dimensions of the elementary magnetized areas, since a grain of this powder should be able to cover an area by itself, obviously without covering the adjacent area. For magnetizable carriers which, for example, have square elementary areas having a side of 100/$\mu$m, use will be made of grains inscribed within a cube having an edge length close to 100 $\mu$m. In a more general manner, with conventional recording carriers, the grain sizes are comprised between approximately 75 $\mu$m and approximately 250 $\mu$m.

In essence, but not exclusively, the usable materials are ferromagnetic metals (in particular iron, nickel, cobalt) applied in pure or alloyed form, the oxides of these metals or metal salts. The grains may be of various shapes: parallelpiped, cubic, tetrahedral, pyramidal, etc. . . .

The material forming the grains of the developer product may be magnetically soft or hard. In the first case, the attraction of a soft grain by a magnetized area is effected by the action of the leakage field of the said area, this field creating a magnetization in the grain, which for its part acts as a magnetized volume having its own leakage field. In these circumstances, the force of attraction of magnetic origin which is exerted between the magnetized area and the grain is proportional to the square of the leakage field gradient produced by the area. In the second case, the magnetically hard grain has an inherent magnetization (the coercivity of the hard materials may be of the order of 200 Oe). The force of magnetic origin which attracts the grain towards the magnetized area is then proportional to the product of the gradient of the leakage field of the layer times the gradient of the field of the grain.

In all cases, the magnitude of these forces does not therefore depend only on the powder applied, but also on the magnetic carrier on which the elementary areas are recorded. The nature and characteristics of this carrier (thickness of the recording layer, magnetization, coercivity) are selected in such manner that the force of magnetic attraction exerted on a grain is greater than the resultant of the opposing forces which tend to move the grain away from the carrier (gravity, centrifugal force in the case of a drum, friction, forces of electrostatic origin, etc.).

BRIEF DESCRIPTION OF THE DRAWINGS

The features and advantages of the invention will appear more clearly from the following description of an embodiment given purely by way of non-limiting explanation. This description relates to the accompanying drawing, in which.

DESCRIPTION OF THE PREFERRED EMBODIMENTS

Figure 1:
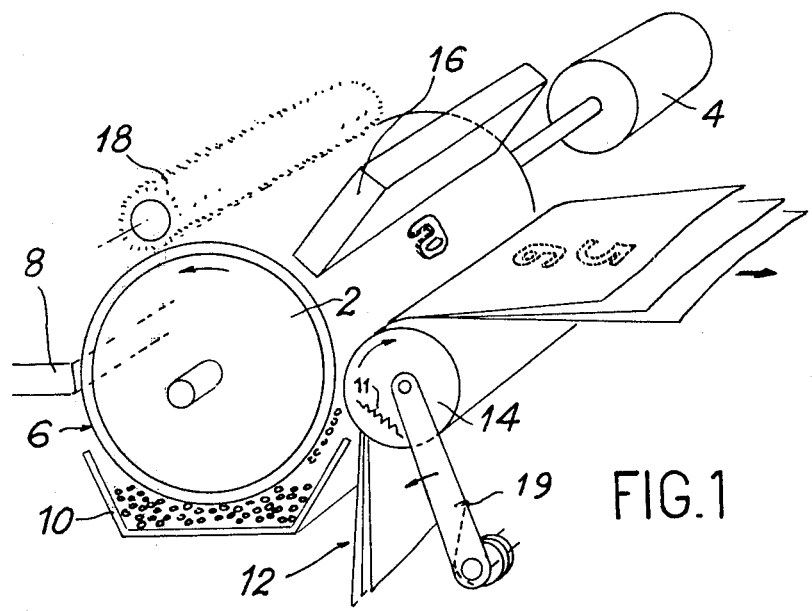
FIG. 1 shows a diagrammatic view of an embodiment of a magnetic drum-type printing machine in accordance with the present invention.

The printing machine illustrated in FIG. 1 comprises, in known manner, a drum 2 adapted to be rotatably driven by a motor 4. The surface of drum 2 is covered with a magnetic layer 6. Layer 6 passes in front of a plurality of recording tranducers 8 adapted to be energized in a conventional manner to record thereon the elementary magnetized areas that form printing characters. The layer 6 passes as the drum is driven before a device 10 which may be a trough filled with magnetic grains for application of the developer product. A document 12 which is to be printed passes between the drum 2 and a roller 14. An erasing device 16 then destroys or erases the magnetic symbols recorded. A cleaning brush 18 rubbing against drum 2 completes the apparatus.

In accordance with the invention, the developer product employed in supply device 10 contains magnetic grains of which the dimensions are such that a single grain may substantially or entirely cover an elementary magnetized area of the layer 6. Furthermore, the drum 14 is biased to exert a pressure on the drum 2, so that the document 12 which is to be printed, which in this case is a sheaf of sheets with interleaved sheets of carbon paper type, is submitted to a sufficient pressure for the raised characters to mark each sheet with their imprint. To this end, the roller 14 may be biased in a resilient manner against the drum 2 by means of a spring 19. The pressure exerted by the roller 14 may possibly be such that the grains are embedded in the first paper sheets, while transferring their imprint to the following sheets.

Figure 2:
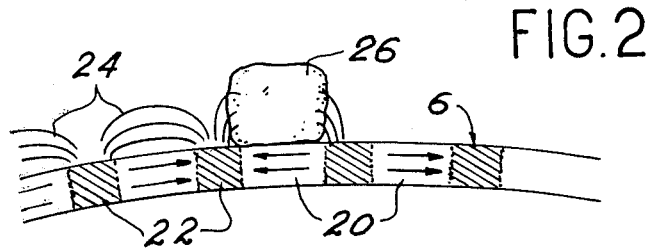
FIG. 2 shows a diagrammatic cross-section of a magnetic layer with longitudinal magnetization covered by a magnetic grain.

FIG. 2 is a diagrammatic section of a magnetic layer 6 with longitudinal magnetization. After passing in front of the recording transducers 8, this layer has elementary areas 20 with longitudinal magnetization, causing the appearance of the magnetic dipoles 22. These dipoles generate a magnetic field of which the lines 24 close within the grain 26 which is applied against the layer. This grain is consequently held on the drum effectively by the action of the magnetic forces.

Figure 3:
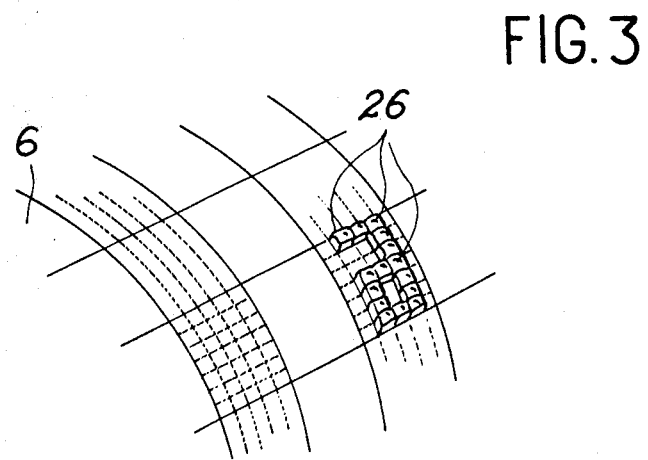
FIG. 3 shows a magnetic carrier covered by a symbol developed in raised form.

Since the leakage flux from an elementary magnetized area 20 is almost wholly intercepted by the grain 26 which covers the area, a second grain which at any time were to cover the first would be subjected to only a very weak force of magnetic attraction and would be separated rapidly from the drum under the action of the opposed mechanical forces. The developer product consequently covers the drum with a "mono-grain" layer. This is illustrated diagrammatically in FIG. 3, wherein the numeral "6" developed by a layer of this kind is visible, the dimensions obviously not being true to scale and being enlarged to illustrate the inventive concept; however, it will be apparent, as previously noted and as shown in FIG. 3, that the elementary magnetic areas are commonly grouped in matrix form, in blocks 5×7 or 7×9, for example, with the characters being formed within the block by a plurality of magnetic particles.

In the preferred embodiment, the printing machine of the present invention does not make use of a product by which the grains are fixed to or on the first sheet of the sheaf. However, it may use such a product in the case in which it is desired to obtain a first sheet with embedded grains. To this end, the developer product may contain an adhesive substance which coats the grains and the machine includes a heater device for heating the first sheet of the sheaf, caused the adhesive to melt or become sticky so as to adhere to the sheaf. The heating device may be part of roller 14 and may be formed by an internal resistance heater diagrammatically shown by element 11.

Purely by way of illustration, a printing machine in accordance with the invention may be constructed with the following characteristics:

| Developer product: | |
| --- | --- |
| Nature of the material: | iron |
| Grain size: | inscribed in a cube with an edge length of 100μm |
| Induction: | 20,000 G |
| Coercivity: | 0.2 Oe |
| Magnetic Carrier: | |
| Drum: | mild steel |
| Nature of the layer: | Cp and P |
| Layer thickness: | 40μm |
| Induction: | 5,000 to 6,000 G |
| Magnetization: | longitudinal |
| Coercivity: | 500 Oe |
| Leakage field: | 150 Oe |
| Size of an elementary area | 100 × 100μm |

I claim:

1. A process of magnetic printing wherein a plurality of elementary magnetized areas in matrix form forming printing characters are recorded on a magnetizable carrier, comprises depositing on the carrier a developer product containing magnetic particles which are attracted by and fixed on the magnetized areas and thus reveal the characters recorded, said magnetic particles being formed by grains of which the dimensions are of the order of those of the elementary magnetized areas, the symbols covered by such grains thus appearing raised on the carrier;

and pressing the raised symbols against a document which is to be printed.

2. A process according to claim 1, wherein the carrier is such that the force of attraction exerted by a magnetized area on a grain is greater than the resultant of the opposing forces which tend to separate the grain from the carrier.

3. A process according to claim 1 wherein the document to be printed is a sheaf of sheets provided with interleaved sheets able to mark the adjacent sheets under the action of pressure of the pressing step.

4. A magnetic printing machine comprising a magnetizable carrier, magnetic transducer means for recording a plurality of elementary magnetic areas in matrix form for forming print characters on said carrier, supply means for applying a developer product onto the carrier, said developer product containing magnetic particles which are attracted by and then fixed on the elementary magnetized areas and thus develop the characters recorded by said transducer means, said developer product containing magnetic particles formed by grains of which the dimensions are of the order of those of the elementary magnetized areas, a grain being able to cover a large proportion of an elementary magnetized area, the characters covered by such grains thus appearing in raised form, and means for pressing the carrier against a document to be printed such that the raised characters exert a pressure on the document which is to be printed.

5. A magnetic printing machine according to claim 4 wherein the document to be printed is a sheaf of sheets provided with interleaved sheets able to mark the adjacent underlying sheets under the action of the pressure exerted by the raised characters.

6. A magnetic printing machine according to claim 4 wherein the dimensions of the elementary magnetized areas of the carrier and those of the grains are between 75 and 250 μm.

7. A magnetic printing machine according to claim 4 wherein the means for pressing comprises a roller biased resiliently against the magnetic carrier, the document to be printed being arranged to pass between the roller and the magnetic carrier.

8. A magnetic printing machine according to claims 4 or 7 wherein the magnetic grains are sheathed in a product which becomes adhesive under the action of heat.

9. A magnetic printing machine according to claim 8 wherein said means for pressing includes a heating device which acts on the document which is to be printed.

10. A process of magnetic printing comprising recording a plurality of elementary magnetized areas in matrix form for forming printing characters on a magnetizable carrier, said elementary areas having longitudinal magnetization and being separated by magnetized dipoles which generate a magnetic field adjacent to the magnetized areas, depositing on the carrier a developer product containing magnetic particles which are attracted by and held on the magnetized areas by the magnetic field of the dipoles on an associated magnetized area and thus define the characters recorded, said magnetic particles being formed by grains of which the dimensions are of the older of those of the elementary magnetized areas such that a single grain substantially covers an elementary magnetized area, the symbols covered by such gains thus appearing raised on the carrier; and pressing the raised symbols against a document which is to be printed.

11. A process according to claim 10, wherein the carrier is such that the force of attraction exerted by the magnetic field on a grain is greater than the resultant of the opposing forces which tend to separate the grain from the carrier.

12. A magnetic printing machine comprising a magnetizable carrier, magnetic transducer means for recording a plurality of elementary magnetic areas in matrix form for forming print characters on said carrier, said elementary areas having longitudinal magnetization and being separated by magnetic dipoles which generate a magnetic field adjacent the magnetized areas, supply means for applying a developer product onto the carrier, said developer product containing magnetic particles which are attracted by and held on the elementary magnetized areas by the magnetic field of associated dipoles and thus develop the characters recorded by said transducer means, said magnetic particles being formed by grains of which the dimensions are of the order of those of the elementary magnetized areas such that a single grain substantially covers an elementary magnetized area, the characters covered by such grains thus appearing in raised form, and means for pressing the carrier against a document to be printed such that the raised characters exert a pressure on the document which is to be printed.

13. A magnetic printing machine according to claim 12 wherein the dimensions of the sides of the elementary magnetized areas of the carrier and those of the grains are between 75 and 250 μm.

* * * * *

UNITED STATES PATENT AND TRADEMARK OFFICE
CERTIFICATE OF CORRECTION

PATENT NO. : 4,321,606

DATED : March 23, 1982

INVENTOR(S) : Jean-Pierre Lazzari

It is certified that error appears in the above–identified patent and that said Letters Patent are hereby corrected as shown below:

Claim 10, column 6, line 63, delete "on" and substitute --of--;

Claim 10, column 6, line 68, correct spelling of "grains" from "gains" to --grains--.

Signed and Sealed this

Fifteenth Day of June 1982

[SEAL]

Attest:

GERALD J. MOSSINGHOFF

*Attesting Officer*    *Commissioner of Patents and Trademarks*